Feb. 27, 1934.  W. W. HOOK  1,948,579
CAMERA
Filed Feb. 26, 1932  3 Sheets-Sheet 1
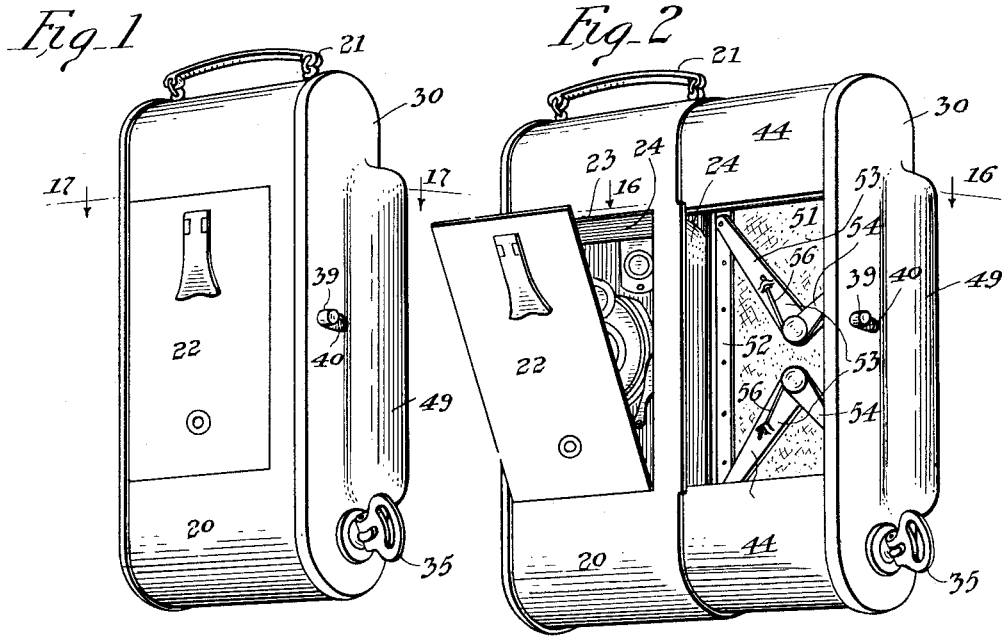
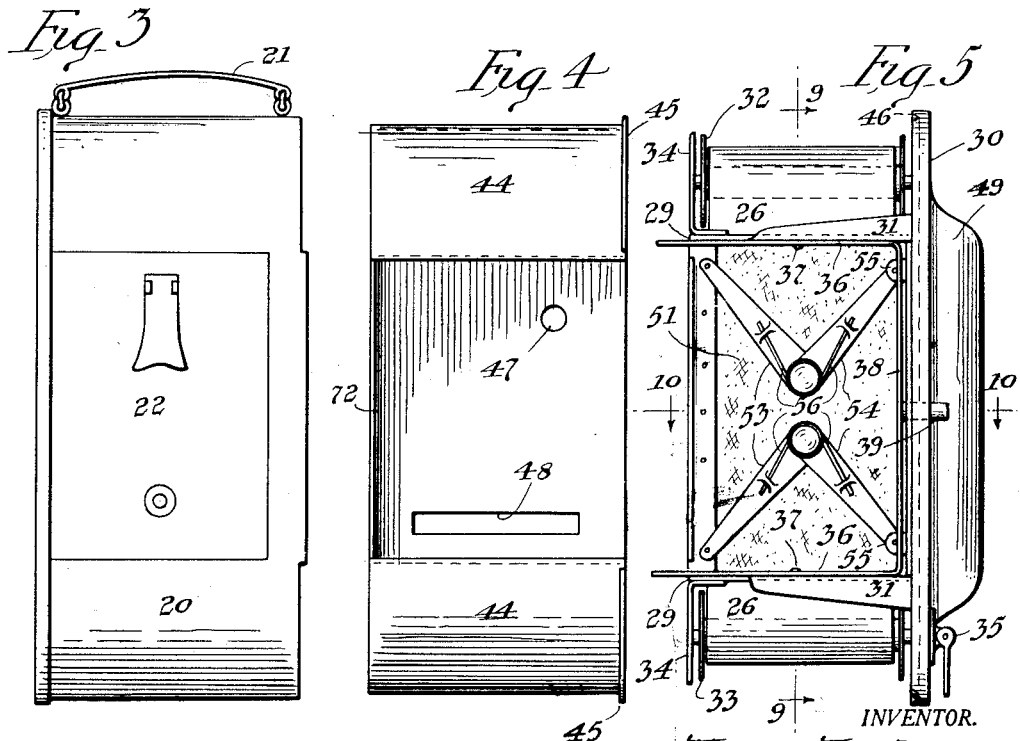
INVENTOR.
Walter W. Hook
BY Brayton Richards
ATTORNEY.

Feb. 27, 1934.  W. W. HOOK  1,948,579
CAMERA
Filed Feb. 26, 1932  3 Sheets-Sheet 2
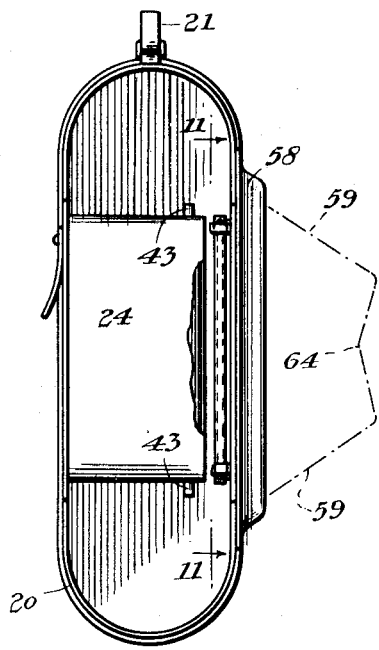
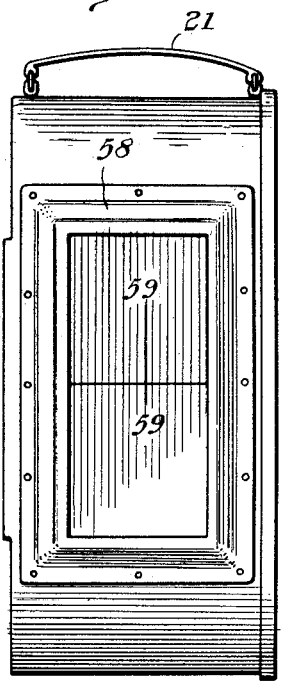
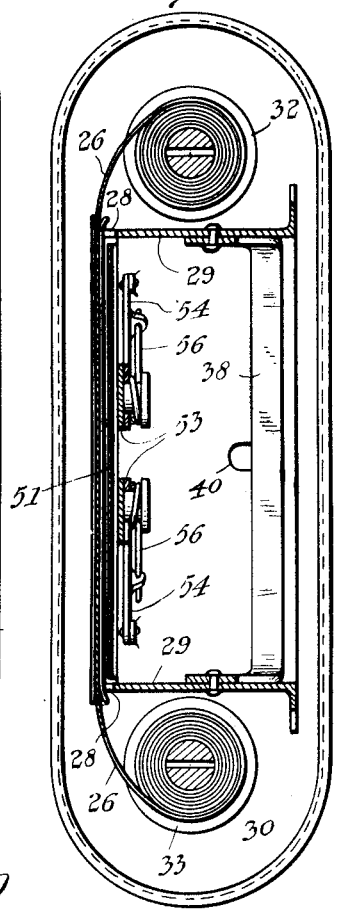
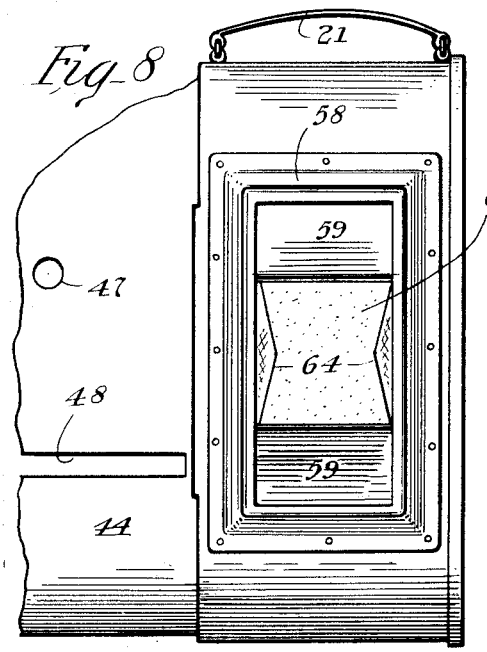
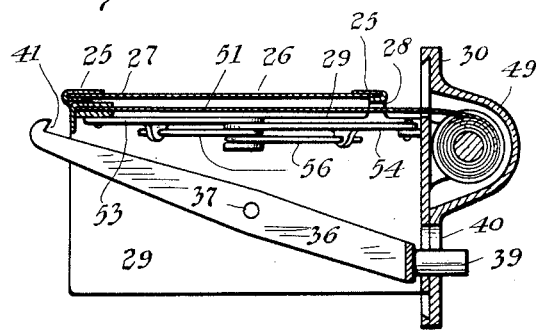
INVENTOR.
Walter W. Hook
BY
Brayton Richards
ATTORNEY.

Feb. 27, 1934.  W. W. HOOK  1,948,579
CAMERA
Filed Feb. 26, 1932   3 Sheets-Sheet 3
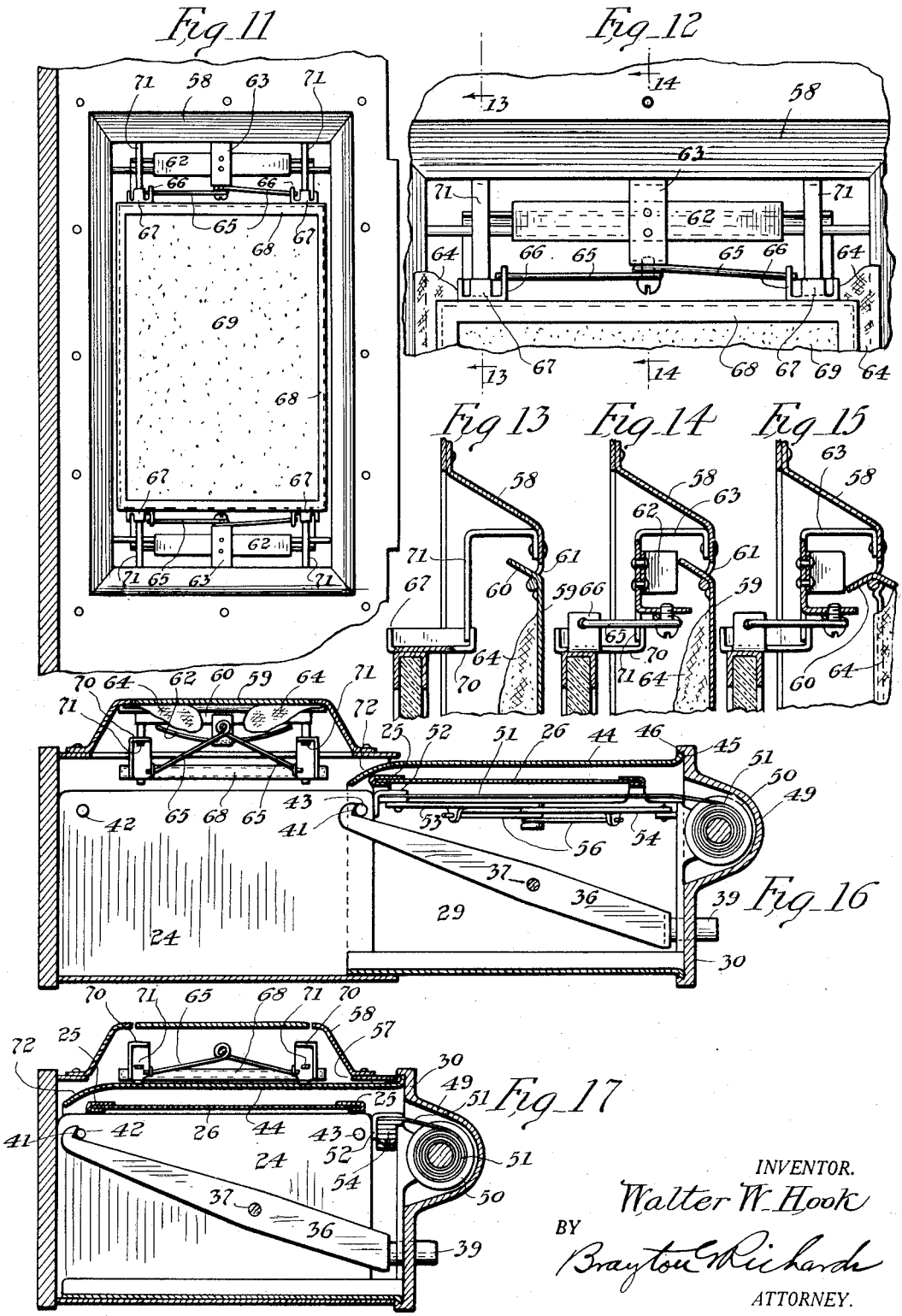

Patented Feb. 27, 1934

1,948,579

UNITED STATES PATENT OFFICE 1,948,579

CAMERA

Walter William Hook, Los Angeles, Calif.

Application February 26, 1932. Serial No. 595,272

9 Claims. (Cl. 95—32)

The invention relates to improvements in cameras and has for its primary object the provision of an improved camera so constructed and arranged as to greatly facilitate the accurate focusing of the camera when desired.

Another object of the invention is the provision of a camera of the folding, roll film type which may be also readily used in portrait or view photography where careful study of a large size image is indispensable to good results.

Another object of the invention is the provision of a camera of the character indicated so constructed and arranged as to facilitate the quick and accurate conversion thereof for one purpose or the other.

Other objects will appear hereinafter.

The invention consists in the combinations and arrangements of parts hereinafter described and claimed.

The invention will be best understood by reference to the accompanying drawings forming a part of this specification, and in which Fig. 1 is a perspective view of a camera embodying the invention and shown in folded or closed condition;

Fig. 2 a perspective view showing the camera with the front thereof partially opened and the side thereof adjusted for accurate focusing;

Fig. 3 a front view of the outer casing of the camera with a removable side member removed therefrom;

Fig. 4 a front view of a guard member detached;

Fig. 5 a front view of the removable side member detached;

Fig. 6 a side view of the construction shown in Fig. 3;

Fig. 7 a rear view corresponding with Fig. 6;

Fig. 8 a partial rear view showing the removable side member adjusted into the position indicated in the perspective view Fig. 2;

Fig. 9 an enlarged section taken substantially on line 9—9 of Fig. 5;

Fig. 10 a horizontal section taken substantially on line 10—10 of Fig. 5;

Fig. 11 an enlarged section taken substantially on line 11—11 of Fig. 6;

Fig. 12 an enlarged detail view of the parts shown in the upper portion of Fig. 11;

Fig. 13 a section taken substantially on line 13—13 of Fig. 12;

Fig. 14 a section taken substantially on line 14—14 of Fig. 12;

Fig. 15 a view similar to Fig. 14 but showing the positions of the parts when the focusing shutters are opened;

Fig. 16 a section taken substantially on line 16—16 of Fig. 2; and

Fig. 17 a section taken substantially on line 17—17 of Fig. 1.

The embodiment of the invention illustrated in the drawings comprises an outer camera casing 20 provided at its top with a suitable handle 21 and in its front wall with an outwardly and downwardly swinging combined closure and supporting plate 22, swinging into and out of the front opening 23 as indicated. The front opening 23 is surrounded by an inner housing 24, best shown in Figs. 2, 6, 16 and 17, said housing 24 being open at the rear, as indicated in Fig. 6.

Arranged within the housing 24 is the usual camera extensible lens and cooperating parts adapted and arranged to be extended outwardly upon the downwardly folding supporting plate 22 in the usual manner to permit of the proper arrangement of the lens thereon for taking photographs, as will be readily understood by those skilled in the art, no change having been made by me in such mechanism.

As best shown in Figs. 9, 10 and 16, channeled film guides 25, adapted and arranged to guide and hold a film 26 in proper relation with the rear of the housing 24 and with the lens arrangements therein for the taking of photographs, are supported on suitable legs or brackets 27 and 28 arranged on supporting plates 29. The supporting plates 29 are carried by and project laterally from a removable side member 30 for the outer casing 20, said supporting plates 29 being reinforced and stiffened by stiffening flanges 31 at their forward edges.

As best shown in Figs. 2, 5 and 9, the usual removable film rollers 32 and 33 are removably mounted between supporting brackets 34 on the plates 29 and the removable side member 30 as shown, the roller 33 being equipped with the usual detachable and foldable operating handle 35, whereby the film 26 may be rolled or moved through the film guides 25 in the usual manner for taking photographs, as will be readily understood by those skilled in this art.

As best shown in Figs. 5 and 10, two latch arms 36 are pivoted at 37 to the supporting plates 29, being connected at one of their ends by a yoke bar 38 carrying an operating pin or finger piece 39 projecting laterally through a slot 40 in the side member 30. Each of the latch arms 36 is provided with a detent shoulder 41 adapted and arranged to engage stop pins 42 and 43 on the top and bottom of the housing 24, as best indicated in Figs. 16 and 17, said latch arms thus serving to lock the side member 30 in its folded position within the casing 20 or in its extended position protruding laterally from said casing 20, the pin 39 serving as a means for manipulating the latch arms 36.

Obviously also, when desired, if replacing the film roll, the latch arms 36 may be also released from the pins 43 by manipulating the pin 39 to permit of the complete removal of the side member 30 from the outer casing 20.

As best shown in Figs. 2, 4, 5 and 8, a sheet metal guard member 44, provided at one side with a retaining flange 45 adapted to engage a retaining shoulder 46 on the side member 30, is thereby detachably secured to the side member 30 as shown. The guard member 44 is provided with a front opening or gap arranged to pass freely over the housing 24, has a rear sight opening 47 closed by the usual transparent red closure for viewing the numbers or other indicia on the film and also with a slot 48 to permit of autographing the film when desired. Obviously this guard member 44 protects the enclosed parts and also tends to protect the film from being "light struck".

As best shown in Figs. 2, 5, 10, 16 and 17, the side member 30 is provided with an outwardly extending boss 49 forming an interior roll chamber in which is mounted a spring roller 50 carrying a flexible opaque curtain 51 wound or coiled thereon. At its free end the curtain 51 is provided with an operating angle 52 pivotally connected with the outer ends of operating links 53 pivoted centrally to cooperating links 54 which in turn are pivoted to legs 55 on the side member 30, said links 53 and 54 being normally and yieldingly held apart by means of springs 56 as shown.

By this arrangement, when the side member 30 is replaced in position within the casing 20, the operating angle 52 contacts with the side of the housing 54, as best shown in Figs. 16 and 17, thereby being forced to yield as the member is inserted, the curtain 51 being withdrawn by the action of the spring roller 50, so that the film 26 will be automatically exposed for the taking of pictures upon the mere replacement of the side member 30, on and within the casing 24, as best shown in Fig. 17. The relation of the parts is such that when the film 26 is thus placed in position at the rear of the housing 24, it will be in correct position with reference to the camera lens to permit of the taking of photographic negatives in the usual way, as will be readily understood by those skilled in this art.

As best shown in Figs. 6, 7, 8, 11 and 16, the rear of the casing 20 is provided with a sight opening 57 surrounded by a rearwardly and inwardly extending flange or casing 58 equipped with rearwardly swinging shutter or closure members 59, as indicated. These shutters 59 are provided with angularly bent ends 60 swinging freely through slots 61 and engaging at their inner ends with leaf springs 62 supported on central brackets 63 on the upper and lower portions of the flange 58, as indicated, and whereby the shutters 59 will normally be held closed. The shutters 59 are connected by foldable cloth sides 64 which will permit of the closing or opening of the shutters 59 to provide a sight opening for the focusing of the camera, as will be readily understood.

The brackets 63 also carry spring supporting arms 65 sliding freely through perforated ears 66 on brackets 67 secured to the top and bottom edges of a metallic focusing frame 68 equipped with the usual ground glass screen or focusing plate 69. The brackets 67 also carry rearwardly extending stop arms 70, best shown in Figs. 14 and 15, engaging stop brackets 78 on the top and bottom portions of the flange 58. The arrangement is such that the spring arms 65 normally hold the focusing screen 69 forwardly against the stop brackets 71 so that the focusing plate 69 will thus be normally held by the action of the spring arm 65 in proper relation with the lens of the camera for accurate focusing purposes. As best shown in Figs. 16 and 17, the inner rear edge of the guard member 44 is provided with an inwardly curved or bent cam lip 72 adapted and arranged to engage the focusing frame 68 when the side member 30 is inserted within the casing 20, thereby forcing the focusing frame 68 rearwardly and out of the way of the incoming film 26. The relation of the parts is such that in this manner the film 26 will be substituted for the focusing plate 69 in precisely the same relation with the camera lens so as to permit of the proper taking of photographs, as will be readily understood by those skilled in the art.

The specific form and arrangement of parts is a simple and efficient one for the purpose.

While I have illustrated and described the preferred form of construction for carrying my invention into effect, this is capable of variation and modification without departing from the spirit of the invention. I, therefore, do not wish to be limited to the precise details set forth, but desire to avail myself of such variations and modifications as fall within the scope of the appended claims.

I claim:

1. A camera comprising an enclosure equipped with a lens, shutter, focusing means and other devices for taking photographs and including a displaceable rearwardly yielding spring-held focusing screen in proper relation to said lens; a film carrying frame laterally removable from said enclosure and equipped with a film mounting and guide arranged to guide a photographic film in proper relation to said lens; a removable and replaceable opaque guard curtain for said film on said frame; and means for automatically displacing both said screen and curtain upon shifting of said frame to bring said film into proper relation to said lens and automatically restore both said screen and curtain upon reverse shifting of said frame.

2. A camera comprising an enclosure equipped with a lens, shutter, focusing means and other devices for taking photographs and including a displaceable rearwardly yielding spring-held focusing screen in proper relation to said lens; a film carrying frame laterally removable from said enclosure and equipped with a film mounting and guide arranged to guide a photographic film in proper relation to said lens; an opaque guard curtain wound on a spring roller mounted on said frame; a spring-held stretcher bar at the free end of said curtain arranged when free to stretch said curtain over the film; and means for displacing said screen and depressing said stretcher bar upon shifting of said frame to bring said film in proper relation to said lens and restore said screen and stretcher bar upon reverse shifting of said frame.

3. A camera comprising an enclosure having an extensible swinging closure at the front; a casing within said enclosure and containing an extensible lens, shutter, focusing means and other devices for taking photographs, the rear of said casing being open for the purpose; a focusing screen spring mounted at the rear of said enclosure behind said casing to yield rearwardly, there being a closable sight opening at the rear of said enclosure affording view of said screen; a film carrying frame shiftable into and out of said enclosure, one side of said enclosure being open to permit of such shifting; film roll mountings in said frame; film guides on said frame and cooperating with said mountings to guide a photographic film in the plane of said screen; an opaque guard curtain wound on a spring roller mounted on said frame; a spring-held stretcher bar at the free end of said curtain arranged when free to stretch said curtain over the film; and means for displacing said screen and depressing said stretcher bar upon shifting of said frame to bring said film in proper relation to said lens and restore said screen and stretcher bar upon reverse shifting of said frame 4. A camera comprising an enclosure having an extensible swinging closure at the front; a casing within the said enclosure and containing an extensible lens, shutter, focusing means and other devices for taking photographs, the rear of said casing being open for the purpose; a focusing screen spring mounted at the rear of said enclosure behind said casing to yield rearwardly, there being a sight opening at the rear of said enclosure affording view of said screen; a foldable combined hood and closure for said sight opening; a film carrying frame shiftable into and out of said enclosure, one side of said enclosure being open to permit of such shifting; film roll mountings in said frame; film guides on said frame and cooperating with said mountings to guide a photographic film in the plane of said screen; and means for displacing said screen upon insertion of said frame into said enclosure.

5. A camera comprising an enclosure having an extensible swinging closure at the front; a casing within the said enclosure and containing an extensible lens, shutter, focusing means and other devices for taking photographs, the rear of said casing being open for the purpose; a focusing screen spring mounted at the rear of said enclosure behind said casing to yield rearwardly, there being a sight opening at the rear of said enclosure affording view of said screen; a foldable combined hood and closure for said sight opening; a film carrying frame shiftable into and out of said enclosure, one side of said enclosure being open to permit of such shifting; film roll mountings in said frame; film guides on said frame and cooperating with said mountings to guide a photographic film in the plane of said screen; an opaque guard curtain wound on a spring roller mounted on said frame; a spring-held stretcher bar at the free end of said curtain arranged when free to stretch said curtain over the film; and means for displacing said screen and depressing said stretcher bar upon shifting of said frame to bring said film in proper relation to said lens and restore said screen and stretcher bar upon reverse shifting of said frame.

6. A camera comprising an enclosure equipped with a lens, shutter, focusing means and other devices for taking photographs and including a displaceable rearwardly yielding spring-held focusing screen in proper relation to said lens; a film carrying frame laterally removable from said enclosure and equipped with a film mounting and guide arranged to guide a photograph film in proper relation to said lens; a removable and replaceable opaque guard curtain for said film on said frame; and means for automatically displacing both said screen and curtain upon shifting of said frame to bring said film into the position occupied by said screen before displacement and automatically restore both said screen and curtain upon reverse shifting of said frame.

7. A camera comprising an enclosure equipped with a lens shutter, focusing means and other devices for taking photographs and including a rearwardly displaceable focusing screen in proper relation to said lens; a film carrying frame removable from said enclosure and equipped with a film in proper relation to said lens; an opaque guard curtain for said film mounted entirely on said frame and removable therewith; and means for automatically desplacing both said screen and curtain upon replacement of said frame and for automatically restoring both said screen and curtain upon removal of said frame.

8. A camera comprising an enclosure equipped with a lens shutter, focusing means and other devices for taking photographs and including a rearwardly displaceable focusing screen in proper relation to said lens; a film carrying frame removable from said enclosure and equipped with a film mounting and guide arranged to guide a photographic film in proper relation to said lens; an opaque guard curtain for said film mounted entirely on said frame and removable therewith; means for automatically displacing both said screen and curtain upon replacement of said frame and for automatically restoring both said screen and curtain upon removal of said frame; and spring catch mechanism arranged to hold said frame in partially removed position, or to permit complete removal thereof.

9. A camera comprising an enclosure equipped with a lens, shutter, focusing means and other devices for taking photographs and including a displaceable rearwardly yielding spring-held focusing screen in proper relation to said lens; a film carrying frame laterally removable from said enclosure and equipped with a film mounting and guide arranged to guide a photographic film in proper relation to said lens; a removable and replaceable opaque guard curtain for said film on said frame; means for automatically displacing both said screen and curtain upon shifting of said frame to bring said film into proper relation to said lens and automatically restore both said screen and curtain upon reverse shifting of said frame; and spring catch mechanism arranged to hold said frame in partially removed position, or to permit complete removal thereof.

WALTER WILLIAM HOOK.